(12) United States Patent
Hara

(10) Patent No.: US 8,194,941 B2
(45) Date of Patent: Jun. 5, 2012

(54) CHARACTER NOISE ELIMINATING APPARATUS, CHARACTER NOISE ELIMINATING METHOD, AND CHARACTER NOISE ELIMINATING PROGRAM

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 1179 days.

(21) Appl. No.: 12/013,522

(22) Filed: Jan. 14, 2008

(65) Prior Publication Data

US 2008/0226143 A1   Sep. 18, 2008

(30) Foreign Application Priority Data

Mar. 12, 2007 (JP) ................................ 2007-062096

(51) Int. Cl.
G06K 9/00 (2006.01)
G06K 9/40 (2006.01)
(52) U.S. Cl. ...................................... 382/124; 382/275
(58) Field of Classification Search .................. 382/124, 382/125, 254
See application file for complete search history.

(56) References Cited

U.S. PATENT DOCUMENTS

| 5,689,590 | A | * | 11/1997 | Shirasawa et al. | 382/254 |
|---|---|---|---|---|---|
| 5,949,913 | A | * | 9/1999 | Shimazu et al. | 382/254 |
| 5,982,914 | A | * | 11/1999 | Lee et al. | 382/124 |
| 6,052,489 | A | * | 4/2000 | Sakaue | 382/266 |
| 6,473,535 | B1 | * | 10/2002 | Takaoka | 382/274 |
| 6,583,823 | B1 | * | 6/2003 | Shimada et al. | 348/616 |
| 6,771,814 | B1 | * | 8/2004 | Nakajima | 382/168 |
| 7,607,338 | B1 | * | 10/2009 | Lewis et al. | 73/31.02 |
| 7,916,957 | B2 | * | 3/2011 | Hara | 382/237 |
| 8,014,574 | B2 | * | 9/2011 | Hara | 382/124 |
| 8,014,602 | B2 | * | 9/2011 | Ohara | 382/171 |
| 8,045,818 | B2 | * | 10/2011 | Sato et al. | 382/254 |
| 2002/0051209 | A1 | * | 5/2002 | Yamada | 358/2.1 |
| 2002/0071131 | A1 | * | 6/2002 | Nishida | 358/1.9 |
| 2002/0159636 | A1 | * | 10/2002 | Lienhart et al. | 382/176 |

(Continued)

FOREIGN PATENT DOCUMENTS

DE   195 36 170 A1   4/1997

(Continued)

OTHER PUBLICATIONS

Cannon, et al., "Background pattern removal by power spectral filtering", Applied Optics, Mar. 15, 1983, pp. 777-779, vol. 22, No. 6, Optical Society of America.

(Continued)

*Primary Examiner* — Michelle Entezari
(74) *Attorney, Agent, or Firm* — Sughrue Mion, PLLC

(57) ABSTRACT

To provide a character noise eliminating apparatus that can eliminate a character noise when a fingerprint ridgeline area has a higher density than a character noise area. A character noise eliminating apparatus includes a device for repeating a processing in which a binary image is generated by binarizing an image with a binarization threshold that is inputted by an operator and the binary image is displayed on a data display device, and determining the character noise area, a device for setting density conversion area layers inside and outside the character noise area, and a device for setting a neighboring pixel group within the same density conversion area layer as the density conversion area layer to which a target pixel belongs as a reference area of the target pixel, with respect to pixels in the density conversion area layers, and generating a density converted image applying a local image enhancement.

15 Claims, 15 Drawing Sheets

U.S. PATENT DOCUMENTS

| | | | |
|---|---|---|---|
| 2003/0225693 A1* | 12/2003 | Ballard et al. | 705/42 |
| 2004/0042640 A1* | 3/2004 | Ikeda et al. | 382/115 |
| 2004/0120555 A1* | 6/2004 | Lo | 382/124 |
| 2004/0234148 A1* | 11/2004 | Yamada | 382/250 |
| 2005/0058334 A1* | 3/2005 | Armstrong | 382/141 |
| 2005/0235846 A1* | 10/2005 | Ebisawa et al. | 101/128.4 |
| 2005/0238212 A1* | 10/2005 | Du et al. | 382/124 |
| 2006/0126908 A1* | 6/2006 | Moon et al. | 382/125 |
| 2006/0206723 A1* | 9/2006 | Gil et al. | 713/186 |
| 2007/0047785 A1* | 3/2007 | Jang et al. | 382/125 |
| 2010/0239132 A1* | 9/2010 | Biswas et al. | 382/124 |

FOREIGN PATENT DOCUMENTS

| | | |
|---|---|---|
| DE | 100 54 185 A1 | 5/2002 |
| DE | 10 2007 040 070 A1 | 4/2008 |
| DE | 10 2007 035 884 A1 | 7/2008 |
| JP | 2002-99912 A | 4/2002 |
| JP | 2006-239554 | 9/2006 |

OTHER PUBLICATIONS

Hong, et al., "Fingerprint Image Enhancement: Algorithm and Performance Evaluation", IEEE Transactions on Pattern Analysis and Machine Intelligence, 1998, pp. 1-30.

"ANSI/NIST-ITL-1-2000 Data Format for the Interchange of Fingerprint, Facial, & Scar Mark & Tattoo (SMT) Information", standardized by National Institute of Standards and Technology, Sep. 2000, pp. 1-69, US.

* cited by examiner

LATENT PRINT IMAGE GI

IMAGE ENHANCEMENT RESULT GE

INPUT GRAY IMAGE AND PROFILE

CHARACTER NOISE AREA IMAGE BINARIZED WITH
THRESHOLD DESIGNATED BY OPERATOR

BINARY IMAGE B(210) WITH THRESHOLD 210

BINARY IMAGE B(180) WITH THRESHOLD 180

BINARY IMAGE B(200) WITH THRESHOLD 200

CHARACTER NOISE AREA IMAGE CA

DENSITY CONVERSION AREA LAYER $R_{A\_O}$
OUTSIDE CHARACTER NOISE AREA

DENSITY CONVERSION AREA LAYER $R_{A\_I}$
INSIDE CHARACTER NOISE AREA

INPUT IMAGE GI

EDGE LAYER OF CHARACTER NOISE AREA

CONVERSION AREA LAYER RA_O OUTSIDE CHARACTER NOISE AREA

DENSITY CONVERTED IMAGE GR

SYNTHETIC IMAGE GC

INPUTTED GRAY IMAGE GI

IMAGE ENHANCED GRAY IMAGE GE

INPUT GRAY IMAGE AND PROFILE

WHITE CHARACTER AREA IMAGE BINARIZED WITH
THRESHOLD DESIGNATED BY OPERATOR

CHARACTER NOISE ELIMINATING APPARATUS, CHARACTER NOISE ELIMINATING METHOD, AND CHARACTER NOISE ELIMINATING PROGRAM

CROSS-REFERENCE TO RELATED APPLICATION

This application is based upon and claims the benefit of priority from Japanese patent application No. 2007-062096, filed on Mar. 12, 2007, the disclosure of which is incorporated herein in its entirety by reference.

BACKGROUND OF THE INVENTION

1. Field of the Invention

The present invention relates to a system processing digital images with a lot of background noises, such as latent fingerprint images and the like, using a computer.

2. Description of the Related Art

Generally, a fingerprint configured with a plurality of streak pattern ridgelines has two main characteristics, permanence and uniqueness. Therefore, fingerprints have been used in criminal investigations from old times. In particular, collation using the latent fingerprints left behind in criminal scenes is effective as a way to help the investigations. Recently, a fingerprint matching system using computers has been introduced, and latent fingerprint matching is conducted in various police agencies.

However, many of the images of the latent fingerprints are of low quality with a noise, which makes it difficult for an investigator to make a judgment. This is also a large factor for hindering the system from being automated. There are many kinds of background noises in the latent fingerprints. One of those is a background noise with irregular shape represented by letters (hereinafter, such a noise is referred to as a "character noise"). FIG. 4A illustrates an example of a latent fingerprint. As in the example, there are cases where fingerprint ridgelines are left on characters and ruled lines of checks. Such character noises are likely to be misjudged and extracted as the fingerprint ridgelines with a related art, so that it is difficult to enhance or extract only the fingerprint ridgelines.

As a related technique for eliminating the background pattern noise, it is common to employ Fourier transformation.

However, when this technique is employed for eliminating the character noises from a fingerprint image, it is necessary for the character noises to appear periodically. Thus, the effect thereof is limited. Further, when the periodicity of the character noises is similar to the periodicity of the fingerprint ridgelines, the fingerprint ridgelines are eliminated as well. Accordingly, the effect is limited. Furthermore, the density of the fingerprint ridgelines in the area with no character noise is deteriorated with the character noise eliminating processing, so that the effect thereof is also limited.

Further, there are various measures proposed as a related method for enhancing the fingerprint ridgelines, in which the direction and periodicity of local ridgelines are extracted, and the ridgelines are enhanced through filter processing that corresponds to the extracted direction and periodicity. This method is proposed in "Fingerprint Image Enhancement: Algorithm and Performance Evaluation (1998)" by Hong, et al., IEEE Transactions on Pattern Analysis and Machine Intelligence (Non-patent Document 2) and Japanese Unexamined Patent Publication 2002-99912 (Patent Document 1).

However, these related arts are not effective when the ridgeline directions and periodicities cannot be extracted properly due to the influence of the character noise. Thus, the issue still remains to be overcome.

As the character noise eliminating technique, there is an effective method proposed by the present inventor in a Japanese Patent Application 2006-239554. This invention includes: a character noise area detection device for detecting a character noise area which corresponds to a character noise from an image; a density conversion area layer determination device for setting a plurality of density conversion area layer inside and outside the character noise area; and a density conversion device for, as a reference area for a target pixel, with respect to the pixels included in the density conversion area layer, setting a neighboring pixel group within the same density conversion area layer as the density conversion area layer to which the target pixel belongs, and generating a density converted image by applying a local image enhancement. Thus, the character noise can be eliminated effectively by automated processing.

However, with the method described in a specification of Japanese Patent Application 2006-239554, character noise areas can be eliminated only in a case where minimum densities of the character noise areas are higher than a maximum density of fingerprint ridgelines. If the density of the fingerprint ridgelines area is higher than the density of the character noise area, the character noise area cannot be extracted completely. Consequently, the character noise areas cannot be fully eliminated. Further, in the character noise area detecting processing, a fingerprint ridgeline area may be misjudged as a character noise area and extracted, that ends up eliminating a fingerprint ridgeline. That is an adverse effect.

SUMMARY OF THE INVENTION

So, an exemplary object of the present invention is to provide a character noise eliminating apparatus and the like capable of eliminating character noises even in a case where a density is higher in fingerprint ridgeline areas than character noise areas.

As an exemplary aspect of the invention, a character noise eliminating apparatus according to the present invention includes: a character noise area determining device for repeating a processing, in which a binary image is generated by binarizing an image with a binarization threshold that is inputted by an operator and the binary image is displayed on a data display device, until the operator indicates confirmation that a character noise area is detected properly, and determining the character noise area depending on the binary image finally generated; a density conversion area layer determining device for setting a plurality of density conversion area layers inside and outside the character noise area; and a density converting device for, as a reference area of a target pixel, setting a neighboring pixel group within the same density conversion area layer as the density conversion area layer to which the target pixel belongs, and generating a density converted image by applying local image enhancement.

According to the character noise eliminating apparatus described above, a character noise area is determined exactly by providing an operator with an interface (the character noise area determining device) with which the operator can input a character noise density threshold manually and effectively, the density conversion area layer determining device sets a plurality of density conversion area layers inside and outside the noise area, and the density converting device enhances ridgelines by using a local image enhancing method (adaptive histogram equalization or the adaptive contrast stretch), limiting at each density conversion area layer. Thus, the character noise is eliminated.

A character noise in this case is an atypical background noise. The character noise includes both of a black character noise in which a minimum density thereof is higher than a maximum density of fingerprint ridgelines, and a white character noise in which a maximum density thereof is lower than a minimum density of fingerprint ridgelines.

Consequently, fingerprint ridgelines are enhanced and extracted easily. When it is applied to a latent fingerprint, the character noise is eliminated both in the cases where the character noise is a black character noise and where the character noise is a white character noise, and fingerprint ridgelines with the ridgelines enhanced can be displayed, so that an investigator can identify a fingerprint easily. Further, an image with its character noise eliminated can be used for feature extraction, so that features can be extracted more accurately, and thereby accuracy of fingerprint matching is improved.

As another exemplary aspect of the invention, a character noise eliminating method according to the present invention includes: a character noise area determining step of repeating a process, in which a binary image is generated by binarizing an image with a binarization threshold inputted by an operator and the binary image is displayed in a data display step, until the operator indicates confirmation that a character noise area is detected properly, and determining the character noise area depending on the binary image finally generated; a density conversion area layer determining step of setting a plurality of density conversion area layers inside and outside the character noise area; and a density converting step of, as a reference area of a target pixel, setting a neighboring pixel group within the same density conversion area layer as the density conversion area layer to which the target pixel belongs, and generating a density converted image by applying with local image enhancement; so as to eliminate the character noise.

As still another exemplary aspect of the invention, a character noise eliminating program according to the present invention makes a computer execute: a character noise area determining processing for repeating a process, in which a binary image is generated by binarizing an image with a binarization threshold inputted by an operator and the binary image is displayed by a data display processing, until the operator indicates confirmation that a character noise area is detected properly, and determining the character noise area depending on the binary image finally generated; a density conversion area layer determining processing for setting a plurality of density conversion area layers inside and outside the character noise area; and a density converting processing for, as a reference area of a target pixel, setting a neighboring pixel group within the same density conversion area layer as the density conversion area layer to which the target pixel belongs, and generating a density converted image by applying local image enhancement.

According to the present invention, for a character noise area determined based on a binary image binarized with a binarization threshold that is inputted by an operator, a density conversion area layer is set inside and outside the character noise area, and the reference area is limited to the neighboring pixel group within the same density conversion area layer as the density conversion area layer to which the target pixel belongs, and then ridgelines are enhanced with the local image enhancement method. Accordingly, the character noise is eliminated.

Consequently, as an exemplary advantage according to the invention, fingerprint ridgelines are enhanced and extracted easily regardless of a character noise density. When it is applied to a latent fingerprint, the character noise is eliminated and fingerprint ridgelines with the ridgelines enhanced can be displayed, and thereby an investigator can identify a fingerprint easily. Further, an image with its character noise eliminated can be used for feature extraction, so that features can be extracted more accurately, and thereby accuracy of fingerprint matching is improved.

DESCRIPTION OF EXEMPLARY EMBODIMENTS

Hereinafter, a configuration and an operation of a fingerprint image enhancing apparatus 10, which is one exemplary embodiment of the present invention, will be explained with reference to the drawings.

(Structure of Fingerprint Image Enhancing Apparatus 10)

Figure 1:
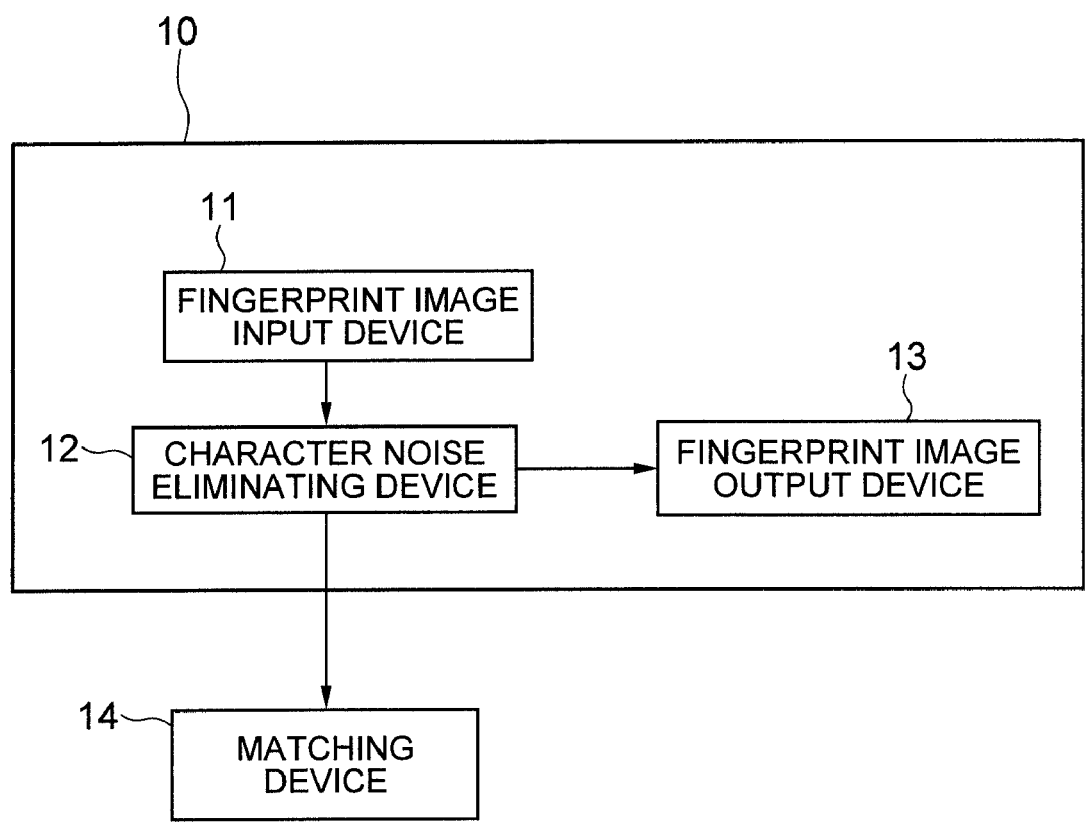
FIG. 1 is an overall block diagram showing a fingerprint image enhancing apparatus which is one exemplary embodiment of the present invention.

FIG. 1 is a functional block diagram for showing a structure of the fingerprint image enhancing apparatus 10.

The fingerprint image enhancing apparatus 10 is, for example, a personal computer, and provided with a fingerprint image input device 11, a character noise eliminating device 12, and a fingerprint image output device 13.

The fingerprint image input device 11 digitizes and inputs fingerprint images that are read out by a sensor or a scanner, for example. Further, the fingerprint image input device 11 may input already-digitized images in a form of file.

The character noise eliminating device 12 has a function of eliminating a character noise from the fingerprint image inputted through the fingerprint image input device 11 and enhancing the ridgeline density.

The fingerprint image output device 13 outputs the fingerprint image processed by the character noise eliminating device 12 to a monitor, a printer, and the like. Further, as a way of example, it is also possible to transmit the fingerprint image processed by the character noise eliminating device 12 directly to a matching device 14 or the like.

Figure 2:
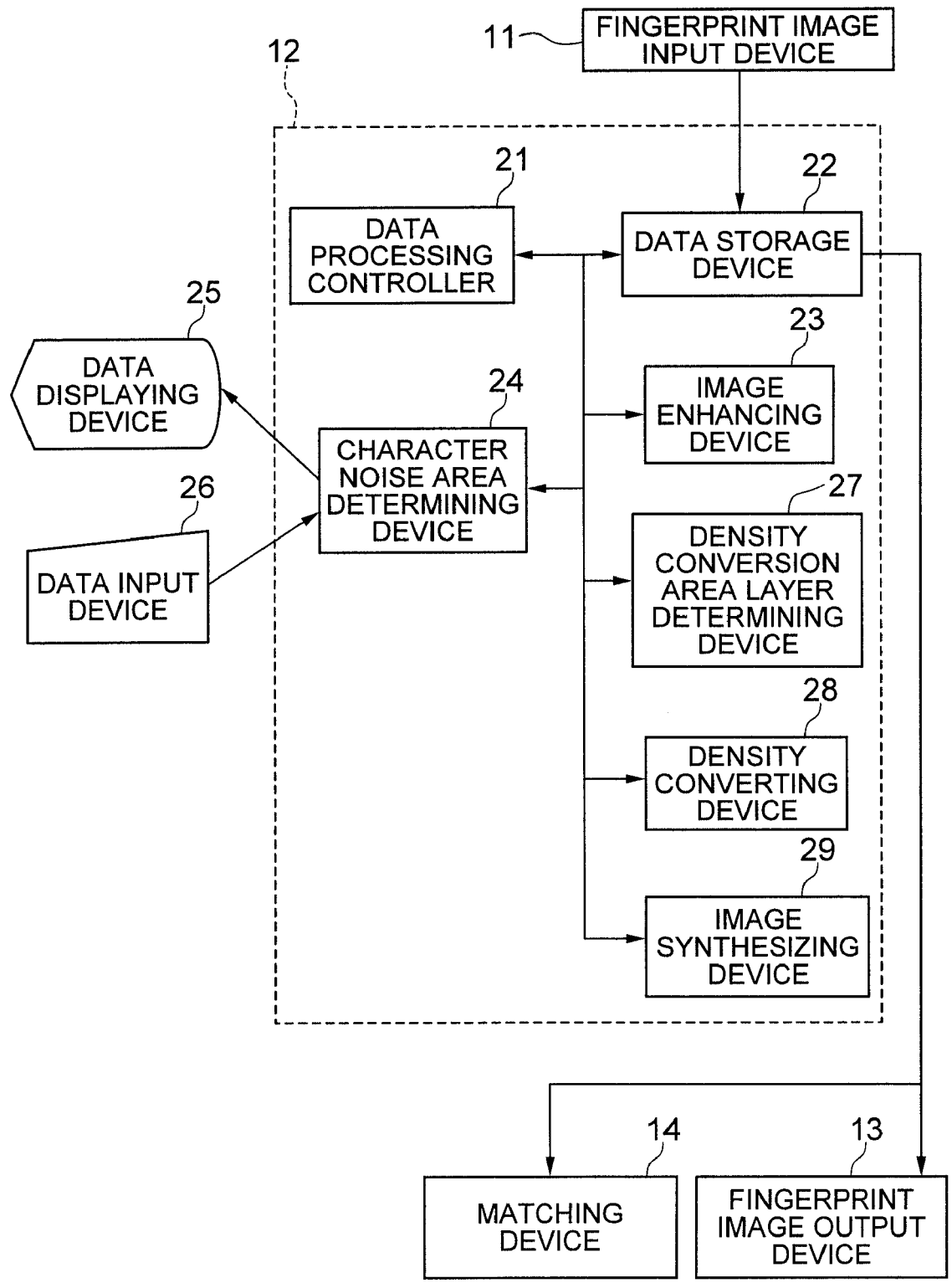
FIG. 2 is a functional block diagram showing a character noise eliminating device in FIG. 1.

FIG. 2 is a functional block diagram for showing the structure of the character noise eliminating device 12.

The character noise eliminating device 12 includes a data processing controller 21, a data storage device (memory device) 22, an image enhancing device 23, a character noise area determining device 24, a data displaying device 25, a data input device 26, a density conversion area layer determining device 27, a density converting device 28, and an image synthesizing device 29.

The data processing controller 21 controls transmission and reception of data and messages exchanged between each of the devices that compose the character noise eliminating device 12.

The data storage device 22 includes a RAM (Random Access Memory), for example, and each of the aforementioned devices that compose the character noise eliminating device 12 uses it as the work area. Further, it is also used for temporarily storing the information calculated by each device.

The image enhancing device 23 includes a function of enhancing a density of an input image by using the local image enhancement method.

The character noise area determining device 24 includes the functions of determining a character noise area corresponding to a character noise depending on a manual assistance under an indication of an operator, and outputting a binary image which dose not include a fingerprint ridgeline component but includes a character noise area in a wide range.

The data display device 25 includes a display, for example, and has a function of displaying a fingerprint image, a binary image binarized with a threshold designated by an operator, an image from which a character noise is eliminated and the like.

The data input device 26 includes a mouse and a tablet, for example, and has the function of inputting a threshold data and the like which are designated by an operator.

The density conversion area layer determining device 27 includes the functions of determining a plurality of density conversion area layers outside and inside the character noise area, and registering them as density conversion area images.

The density converting device 28 includes the function of converting a pixel density of the density conversion area layer by using the density conversion area image of which the density conversion area layer is registered and the input image by the local image enhancement method with which a neighboring pixel group of the density conversion area layer including the pixel is set as a reference area.

The image synthesizing device 29 includes the function of synthesizing an image enhanced by the image enhancing device 23 and an image converted its density by the density converting device 28, by adopting a smaller density value out of the values of the two images for each pixel in the density conversion area, and by adopting a density value of the enhanced image for each pixel outside the density conversion area, and generating an image from which the character noise is eliminated.

Each device described above can be achieved by a CPU (Central Processing Unit) of the fingerprint image enhancing apparatus 10 executing a computer program to control hardware of the fingerprint image enhancing apparatus 10.

Figure 3:
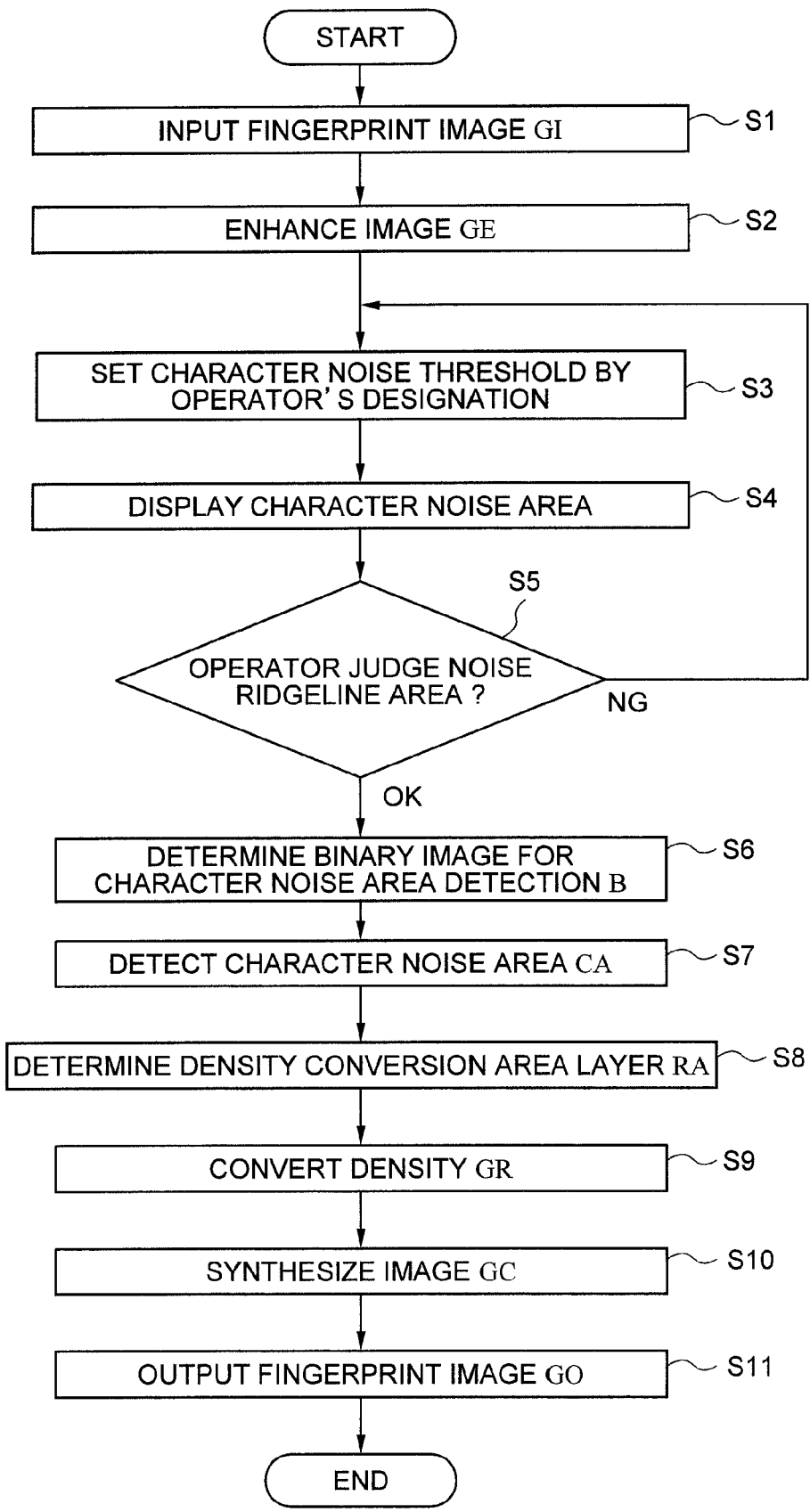
FIG. 3 is a flowchart showing operations of the fingerprint image enhancing apparatus.

FIG. 3 is a flowchart showing the operations of the whole character noise eliminating device 12, the fingerprint image input device 11, and the fingerprint image output device 13. When the minimum density of a character noise area is higher than a maximum density of a fingerprint ridgeline, the character noise is called as a "black character noise". When the maximum density of a character noise area is lower than the minimum density of a fingerprint ridge line, the character noise is called as a "white character noise". Firstly, the case with the black character noise will be explained.

Figure 4A:
FIG. 4A is an illustration showing one example of an input image.

In Step S1 of FIG. 3, the fingerprint image input device 11 shown in FIG. 2 inputs a fingerprint image. In this step, an image read out by a scanner, for example, is digitized and inputted. Further, it is also possible to input an already-digitized fingerprint image file, as another way of example. The fingerprint image example is expressed as GI, and shown in FIG. 4A.

The examples of the finger print images such as the one shown in FIG. 4 are the images obtained by digitizing the fingerprint images that are read out by a sensor or a scanner. Those fingerprint image examples are digitized with the resolution of 500 dpi according to "ANSI/NIST-ITL-1-2000 Data Format for the Interchange of Fingerprint, Facial, & Scar Mark & Tattoo (SMT) Information" that is standardized by National Institute of Standards and Technology (US). This standardization document can be downloaded from the following URL (as of July, 2006). ftp://sequoyah.nist.gov/pub/nist_internal_reports/sp500-245-a16.pdf With the aforementioned standard, the image is digitized to have the density values of two-hundred and fifty-six gradations from 0 to 255. Further, the density values are defined with the luminance standards where the numerical values increase as the luminance becomes higher (brighter). In the exemplary embodiment of the present invention, however, explanations regarding the density values are provided on the basis of the density standards where the numerical values increase as the density becomes higher. Therefore, the ridgeline with high density has the value close to 255 as the maximum value, and the base paper or the valleys with low density has the density value close to 0.

Figure 4B:
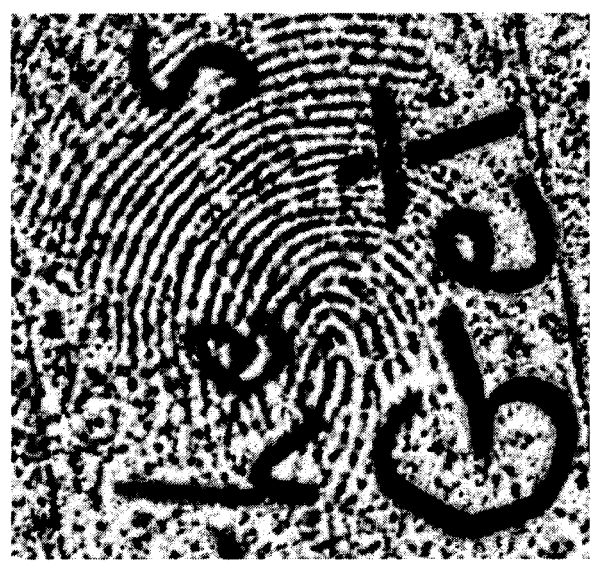
FIG. 4B is an illustration showing one example of an enhanced image which is generated by performing an enhancing processing for the input image of FIG. 4A.

Next, in step S2 of FIG. 3, the image enhancing device 23 shown in FIG. 2 enhances the density of the input image and expands the dynamic range of the fingerprint ridgelines. For the enhancing method, the local image enhancement method represented by the adaptive histogram equalization or the adaptive contrast stretch is adopted. Even in an area where the dynamic range of the fingerprint ridgelines is narrow, it is possible to obtain an image that has a uniform contrast change over the entire area through performing enhancement by using the local image enhancement method. Size setting of the reference area is important with the local image enhancement method. It is set in this case as a circle with a radius of about fifteen pixels. The average pitch between the ridgelines of the fingerprint is about ten pixels (the actual distance is 0.5 mm), so that it is appropriate to set the circle with the radius of about 1.5 times the average ridgeline pitch as the minimum area that includes the contrast change of the ridgeline. FIG. 4B shows an image that is obtained by applying the above-described processing to enhance the input image of FIG. 4A. This fingerprint image is expressed as GE. It can be seen from FIG. 4B that both the area with high background density and the area with low background area density are enhanced uniformly.

The processing hereinafter is broadly separated into two. The first-half processing is the processing from step S3 to step S6 of FIG. 3, in which a binary image necessary for detection of a character noise area is generated. The latter-half processing is the processing from Step S7 to Step S11 in FIG. 3, in which the character noise area is detected, and then a density of pixels in the character noise area is converted to generate a character noise eliminated image.

Here, a reason why the binary image is generated for detecting the character noise area will be explained. In general, it can be assumed that a density value of an area having a character noise is larger than a density value of a neighboring fingerprint ridgeline part (area with no character noise). Accordingly, a target is a case with a fingerprint image where the density value of the character noise area is larger than the density value of the neighboring fingerprint ridgeline part.

Figure 6A:
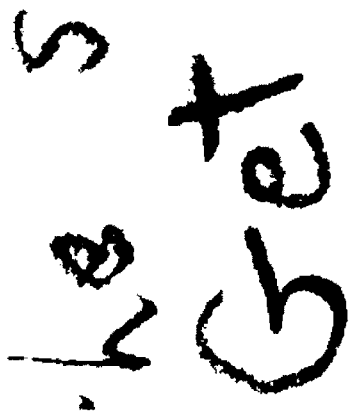
FIGS. 6A, 6B, and 6C are illustrations showing examples of binary images each of which is generated by binarizing the input image in FIG. 4A with different binarization thresholds.
Figure 6B:
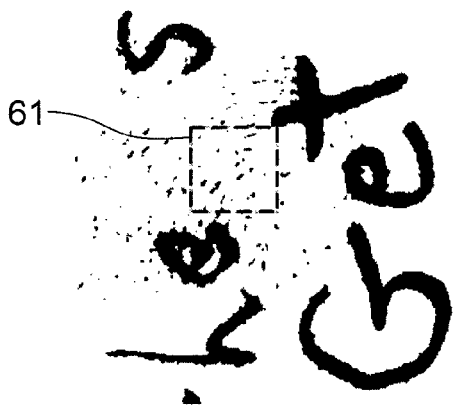
Figure 6C:
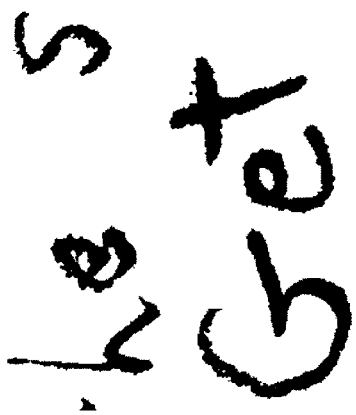

The binary image used here is generated by simply binarizing an input image with some binarization threshold designated by the operator. In this case, when the binarization threshold becomes smaller, the region where a character noise area can be detected becomes wider, but on the other hand, a fingerprint ridgeline part can be also extracted easier. This example will be explained with reference to FIG. 6. FIG. 6A, 6B, 6C show images which are generated by binarizing the input image in FIG. 4 with three kinds of binarization thresholds. In FIG. 6A, the binarization threshold value is much larger than the density of fingerprint ridgeline. Accordingly, though the fingerprint ridgeline is not emerged, the character noise area becomes narrow. In FIG. 6B, the binarization threshold value is smaller than the density of the fingerprint ridgeline, so that the fingerprint ridgeline area is emerged partially (reference numeral 61). In FIG. 6C, the binarization threshold is close to the maximum density of the fingerprint ridgeline area, so that the fingerprint ridgeline is hardly emerged, and the character noise area can be extracted at a maximum.

The target of this processing is generating a binary image in which extraction of a fingerprint ridgeline part can be limited at minimum and, at the same time, a character area can be detected in a possibly wider region. In order to satisfy the above conditions, a manual interface is required to be found out for an operator to designate easily a maximum binarization threshold with which the extraction of the fingerprint ridgeline can be limited at minimum.

Therefore, the apparatus includes the function of displaying a binary image in real time with a designated binarization threshold. According to the function, the operator can judge a binary image with a view of the binary image by lowering a threshold step-by-step from the maximum threshold of 255. When a part of image is emerged in a fingerprint area, the operator can designate a threshold just before the emergence as the binarization threshold.

Figure 5A:
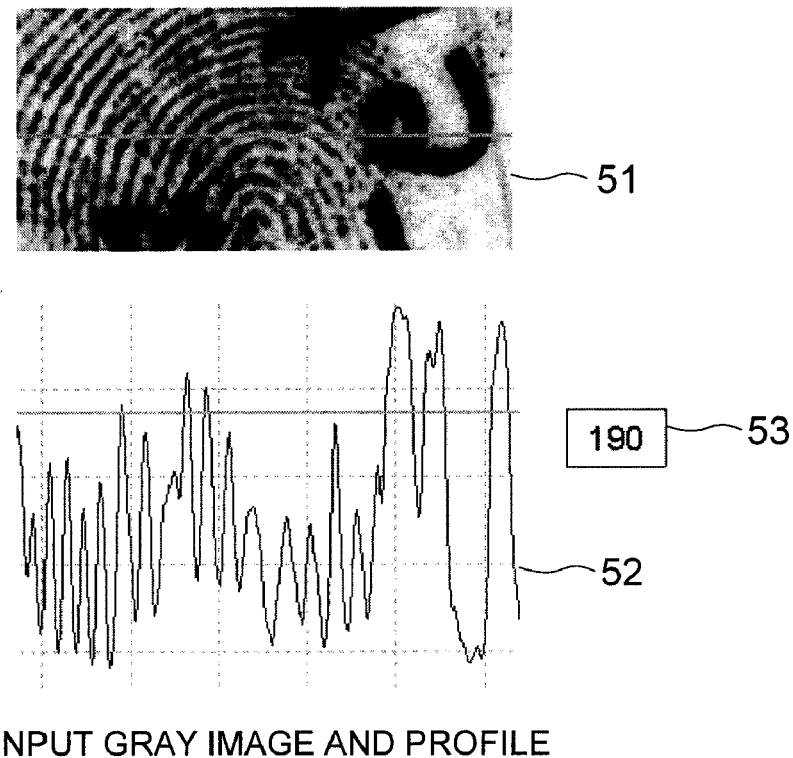
FIG. 5A is an illustration showing one example of input gray images and profiles thereof.

In Step S3 of FIG. 3, the character noise area determining device 24 in FIG. 2 displays a fingerprint image 51 and a profile of density values 52 on the data display device 25, such as a display device, as shown in FIG. 5A. Viewing the image and the profiled density values, the operator can estimate a proper value which is assumed to be an intermediate value between densities of a character noise area and a fingerprint ridgeline area. The character noise area determining device 24 makes the operator input an estimated binarization threshold with the data input device 26, such as a mouse. Specifically, the operator can designate the binarization threshold by sliding a slide bar that shows density values, or by inputting a numerical value into a text box 53.

Figure 5B:
FIG. 5B is an illustration showing a character noise area image generated by binarizing the image in FIG. 5A with a designated threshold.

In Step S4 of FIG. 3, the character noise area determining device 24 in FIG. 2 binarizes the image with the threshold designated by the operator in Step S3, and displays an area which is assumed to be a character noise on the data display device 25. FIG. 5B shows an area that is assumed to be the binarized character noise as described above.

In Step S5 of FIG. 3, depending on a determined result by the operator, the character noise area determining device 24 in FIG. 2 controls a succeeding processing. Viewing the binary image displayed on the data display device 25, the operator judges whether it is appropriate or not for a character noise area.

FIG. 6A shows a character noise area in a case where the operator designates the binarization threshold of 210. When no ridgeline area is detected as shown in this example, it is suggested for the operator to decrease the binarization threshold so that the character noise area can be detected as wide as possible. FIG. 6B shows the character noise area in a case where the operator designates the binarization threshold of 180. When a certain amount of ridgeline area is detected as shown in numeral 61 of this example, it is suggested for the operator to increase the binarization threshold so that the ridgeline area can be minimized. In the above two cases, the character noise area determining device 24 goes back to processing in Step S3 to enable the operator to change the binarization threshold.

FIG. 6C shows the character noise area in a case where the operator designates the binarization threshold of 200. As in the case, when the operator can judge that the character noise area is appropriate, then the processing proceeds to a next, depending on the operator's indication.

FIG. 6 shows images which are binarized with three kinds of binarization threshold, 210, 180, 200 with respect to the input image GI shown in FIG. 4. The binary images as in the case are expressed as B, or such as B(210), appending the binarization threshold.

Next, in Step S6 of FIG. 3, the character noise area determining device 24 in FIG. 2 registers the binary image determined in Step S5 in the memory for detecting a character noise area.

Next, in Step S7 of FIG. 3, the character noise area determining device 24 in FIG. 2 analyses the image for detecting the character noise area which is registered in the memory in Step S6, and eliminates the fingerprint ridgeline component, extracts remaining area as the character noise area so as to register it in the memory as the character noise area image CA. The image for detecting the character noise area includes the character noise area, but on the other hand, a fingerprint ridgeline part also remains therein. However, the fingerprint ridgeline part remains there is like the one shown in the binary image B(200) of FIG. 6C, and it does not have enough length or width as a ridgeline. Accordingly, it can be eliminated with a simple logic. For example, it can be eliminated with a logic of eliminating an independent black pixel area having the maximum length of under about 6 pixels.

It is possible to support an interface which enables the operator to eliminate a remaining fingerprint ridgeline part manually, as an exemplary embodiment. This manual elimination can be achieved with the function, in which a rectangular shape, that is associated with an eraser, is displayed on a screen, and the operator drags it with a mouse, and then dots in its track are turned into white. The interface described above is known and included in many of image processing programs.

Figure 7:
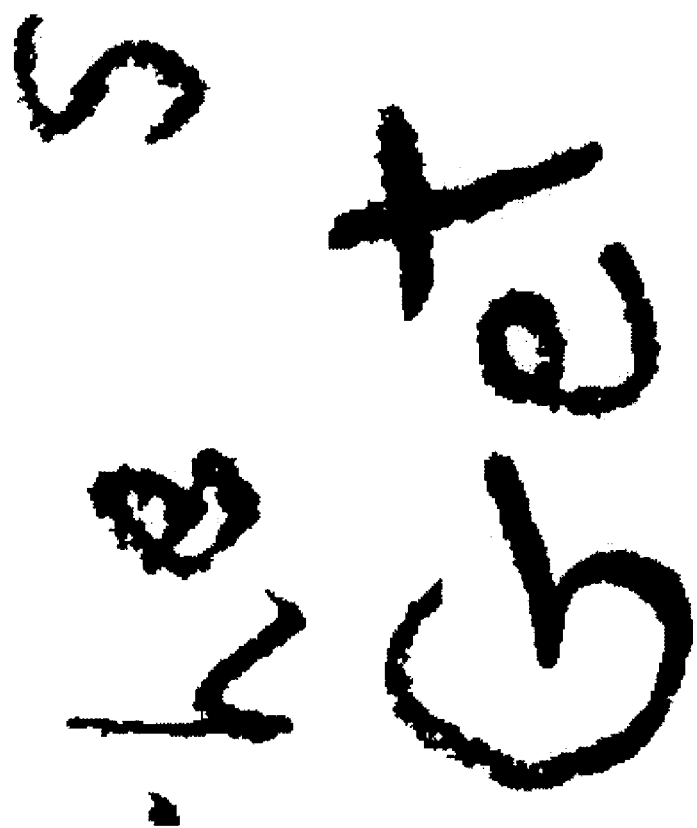
FIG. 7 is an illustration showing one example of character noise area images extracted from the binary image.

The character noise area image CA in which the ridgeline component is eliminated and only the character noise area remains is shown in FIG. 7. Compared to B(200) in FIG. 6C, CA in FIG. 7 shows that the ridgeline component is eliminated therefrom.

Next, in Step S8 of FIG. 3, the density conversion area layer determining device 27 in FIG. 2 determines a plurality of area layers outside and inside the character noise area in a character noise area image CA, and registers it in the memory as a density conversion area image RA.

Firstly, the density conversion area is not set only inside the character noise area, but also set outside thereof. The reason is that some pixels outside the character noise area have higher background densities in many cases because of influence of the character noise area. It is considered that this phenomenon occurs due to the blur of the ink in the vicinity of the edges (boundaries) of the noise or due to the influence of the sensitivity of the sensor. Accordingly, some pixels outside the character noise area are to be targets for density conversion.

Figure 9A:
FIG. 9A is a partially enlarged illustration of an input image in FIG. 4A.
Figure 9B:
FIG. 9B is an illustration describing an edge layer of the character noise area.
Figure 9C:
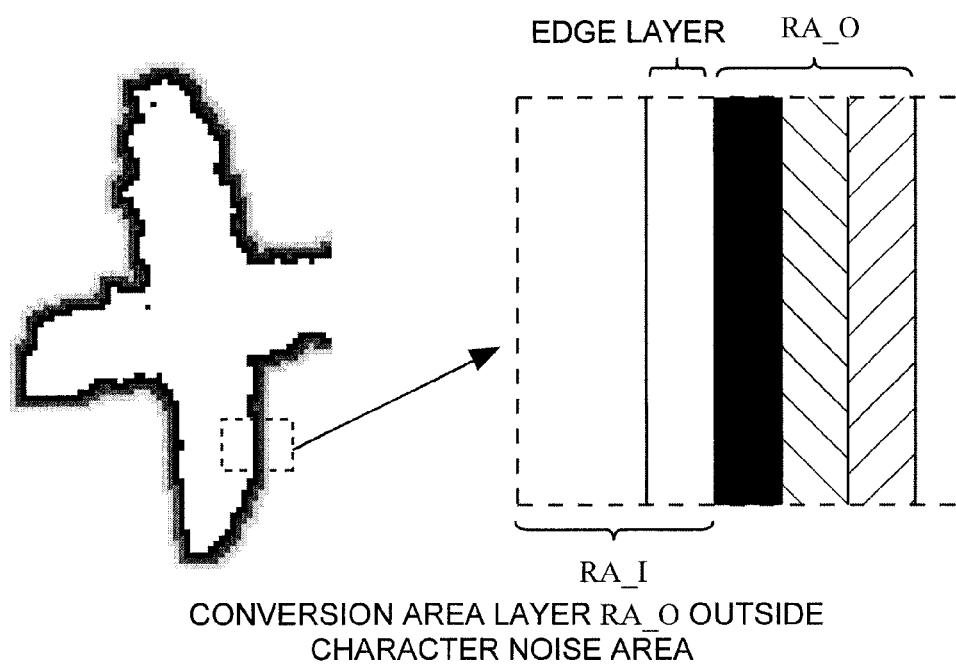
FIG. 9C is an illustration describing a conversion area layer outside the character noise area.
Figure 10:
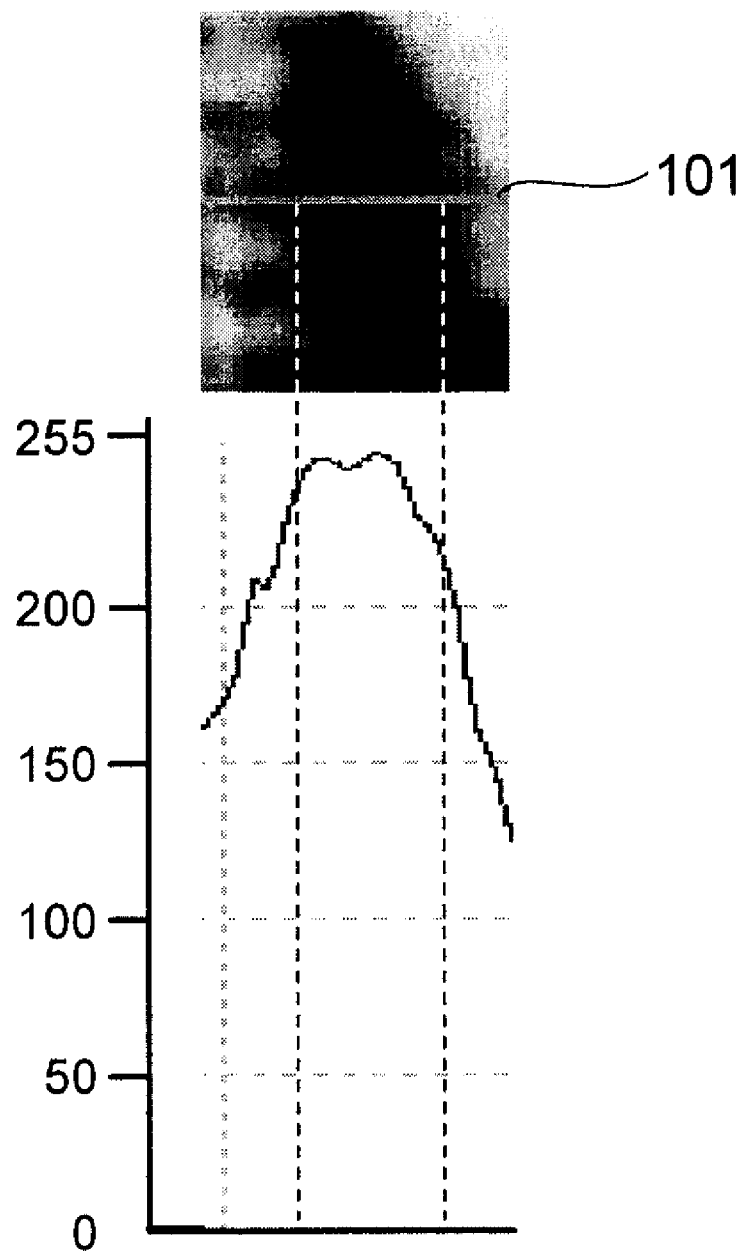
FIG. 10 is an illustration showing a density profile of a character noise area neighborhood.

Next, the reason why the density conversion area layer is set will be explained. The background density outside the character noise area tends to be low gradually from the edge of the character noise area toward outside. As in the same way, the background density inside the character noise area tends to be high gradually from the edge of the character noise area toward inside. This example will be explained with reference to FIGS. 9 and 10. FIG. 9A is an enlarged view of the input image and it includes the character noise area. FIG. 10 is a density profile of a pixel group in a horizontal direction, shown in 101, for a part area of FIG. 9A. In FIG. 10, the tops of the dotted lines show edge pixels of the area extracted as the character noise. According to the density profile, the density near the edges of the character area do not vary drastically, but gradually decreases for some pixels from the edge toward outside. Also, the densities are not even inside the edge, and the density gradually increases for some pixels toward inside.

Therefore, if the area with varying background densities is enhanced as one reference area with the local image enhancement method, an enhancement result is not even. Namely, if the method is applied to the character noise area, a center part of the character noise is converted into a higher density value relatively, and an edge neighborhood is converted into a lower density value relatively, and thereby noise elimination is not effective.

To solve the above described problem, a plurality of density conversion area layers is set near the edge of the noise area. If the noise background densities at each density conversion area layer are even, it can be expected that the character noise component is eliminated from an image converted its density with the local image enhancement taking only the layer as a reference area.

Figure 8A:
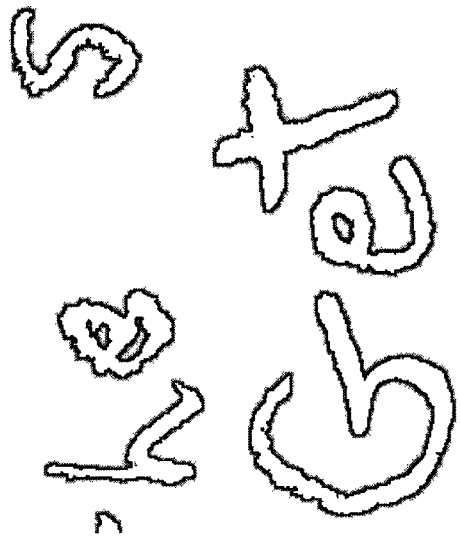
FIG. 8A is an illustration showing one example of density conversion area layers outside the character noise area.
Figure 8B:
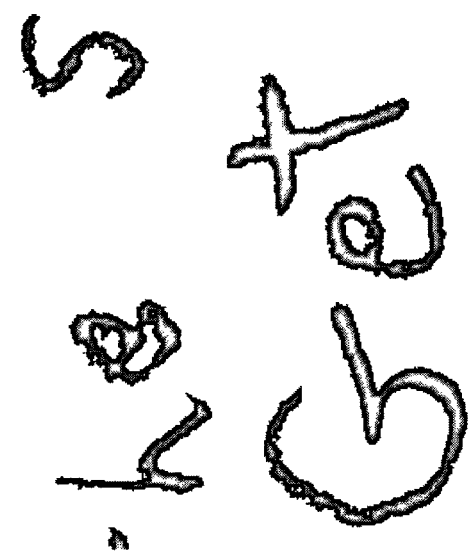
FIG. 8B is an illustration showing one example of density conversion area layers inside the character noise area.

So, a character noise area edge is detected so as to set a plurality of layers with one-pixel width unit outside and inside thereof. In this exemplary embodiment, three outside layers and four inside layers (including an edge layer) are set as conversion layers. This example is shown in FIGS. 8A and 8B. FIG. 8A shows a density conversion area layer outside the character noise area, which is expressed as RA_O. FIG. 8B shows a density conversion area layer inside the character noise area, which is expressed as RA_I.

Next, a relationship between the edge and the area layer will be explained with reference to FIG. 9. FIG. 9B shows an image showing the edge layer of the character noise area, corresponding to FIG. 9A. Also, FIG. 9C shows the density conversion area layer RA_O outside the character noise area, corresponding to FIG. 9A. According to FIG. 9C, three of the density conversion area layers are defined as one-pixel width unit outside the edge layer in FIG. 9B.

Next, in Step S9 of FIG. 3, the density converting device 28 in FIG. 2 converts the density of the input image GI with the local image enhancement method, limiting to a pixel in the density conversion area layer. A reference area for the local image enhancement method is to be a neighboring pixel group (a range is within about 16 pixels) included in the density conversion area layer to which the pixel belongs. As described above, density conversion is performed only for the neighboring pixel group in which pixels have similar noise densities, and thereby it is expected that the character noise component is eliminated from the density converted image.

The local image enhancement method utilized in this density conversion is equivalent to the local image enhancement method utilized in Step S2.

Figure 11:
FIG. 11 is an illustration showing one example of density converted images.

FIG. 11 is a fingerprint image generated by performing the density conversion on the character noise area in FIG. 9A, and is expressed as GR. Comparing FIG. 11 to FIG. 9A, the character noise components almost disappears and the fingerprint ridgelines are enhanced.

Figure 12:
FIG. 12 is an illustration showing one example of synthetic images.

Next, in Step S10 of FIG. 3, the image synthesizing device 29 in FIG. 2 generates a synthetic image GC from which the character noise is eliminated, based on the image GE in which the character noise is enhanced in Step S2 and the image GR performed density conversion in Step S9. Regarding the synthesizing method of the exemplary embodiment, a smaller density value among the density values of GE and GR is adopted with respect to each pixel in the density conversion area, and the density value of the enhanced image GE is adopted with respect to each pixel outside the density conversion area. The reason is that the density value of an image from which the character noise is eliminated becomes small usually. FIG. 12 is an image synthesized as described above. According to it, the character noise components disappear, and only the fingerprint ridgelines are enhanced.

Next, in Step S11 of FIG. 3, the image GO in which the character noises are eliminated and the ridgelines are enhanced is outputted. This image GO is equivalent to the synthetic image GC in this exemplary embodiment. In addition to a monitor and a printer, a matching device and a feature extracting device are also considered as the output destinations.

This example has been described by referring to the case of fingerprint images. However, another example of the present invention can also be applied effectively to palm print images that have the similar patterns as those of the fingerprints.

Figure 13A:
FIG. 13A is an illustration showing one example of input images including white character noises.

Next, it will be explained that an example of the present invention can be applied to elimination of a white character noise, referring to a latent fingerprint having a white character noise shown in FIG. 13, as an exemplary embodiment.

As an exemplary method for white character noise elimination, it is possible to apply the black character noise elimination described above to an image after densities of the inputted image are inverted in black and white, and then, densities of the resulting image are inverted again in black and white.

However, the black and white inversed image is displayed with this method, which causes for a manual interface problems, in which the operator cannot make a judgment easily, and in which a binarization threshold needs to be set up twice for a black character noise and a white character noise.

So, in the present invention, a manual interface is invented with which an input image is displayed as it is, and when a binarization threshold for a white character noise is set up by the operator, an area with a density value under the threshold is displayed as a white character area. The operations in this case will be explained with reference to a flowchart shown in FIG. 3. When an operation is same as the one in the case with the black character noise elimination which is already described, an explanation for the processing will be omitted.

Figure 13B:
FIG. 13B is an illustration showing one example of enhanced images which is generated by performing the enhancing processing for the input image in FIG. 13A.

In Step S2 of FIG. 3, the image enhancing device 23 in FIG. 2 expands a dynamic range of a fingerprint ridgeline by enhancing the density of an input image. FIG. 13B shows an image that is generated by enhancing the input image in FIG. 13A.

Figure 14A:
FIG. 14A is an illustration showing one example of input gray images and profiles thereof.
Figure 14A:
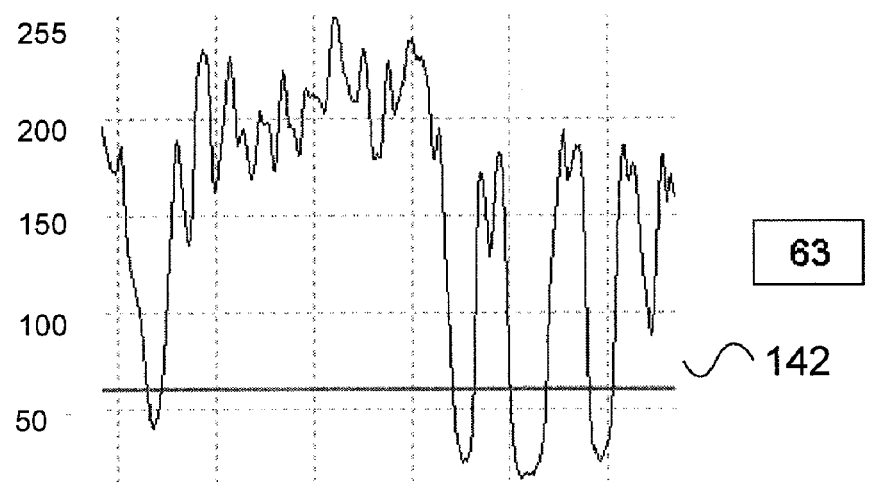

In Step S3 of FIG. 3, the character noise area determining device 24 in FIG. 2 displays a fingerprint image 141 and a profile of density values 142 on the data display device 25 such as a display device, as shown in FIG. 14A. Viewing the image and the profiled density values, the operator can estimate a proper value which is assumed to be an intermediate value between densities of the white character noise area and the fingerprint ridgeline area.

Figure 14B:
FIG. 14B is an illustration showing an character noise area image which is generated by binarizing the image in FIG. 14A with a designated threshold.

In Step 4 of FIG. 3, the character noise area determining device 24 in FIG. 2 binarizes the image with the threshold designated by the operator in Step S3. To eliminate a white character noise, the character noise area determining device 24 binarizes the image by turning an area with a density value less than the threshold to be black and an area with a density value equal to or more than the threshold to be white. As described above, the area assumed to be a binarized white character noise is displayed on the data display device 25. FIG. 14B shows an area which is assumed to be a white character noise that is binarized as mentioned above.

In Step S5 of FIG. 3, the character noise area determining device 24 in FIG. 2 controls a succeeding processing depending on a determined result by the operator. Viewing the binary image displayed on the data display device 25, the operator judges whether the area is appropriate or not for a white character noise area.

The processing from Steps S6 to S9 of FIG. 3 is same as the case of the black character noise elimination, so explanations thereof are omitted.

Figure 15:
FIG. 15 is an illustration showing one example of synthetic images from which the white character noises are eliminated.

Next, in Step S10 of FIG. 3, the image synthesizing device 29 in FIG. 2 generates a synthetic image GC from which the white character noise is eliminated, based on the image GE which is enhanced in Step 2 and the image GR the density of which is converted in Step S9. Regarding the synthesizing method of the exemplary embodiment, a higher density value among the density value of GE and GR is adopted with respect to each pixel in the density conversion area, and the density value of the enhanced image GE is adopted with respect to each pixel outside the density conversion area. The reason is that the density value of an image from which the white character noise is eliminated becomes large usually. FIG. 15 shows an image synthesized as described above. According to it, the white character noise components disappear, and only the fingerprint ridgelines are enhanced.

Hereinbefore, the operations for the black character noise elimination and the white character noise elimination are explained separately. However, if a manual interface which enables the operator to set up binarization thresholds for both types of character noise at once is provided, it is effective because both noises can be eliminated at once.

Hereinafter, the operations for eliminating a black character noise and a white character noise at once will be explained, as an exemplary embodiment.

In Steps S1 and S2 of FIG. 3, the cases are same as the one described in the black character noise elimination.

Next, from Steps S3 to S6 of FIG. 3, both of manual interfaces for setting up a binarization threshold for black character noise and a binarization threshold for white character noise may be conducted. That is, the binarization threshold for black character and the binarization threshold for white character are inputted at the same time, and the binary images binarized with each threshold are displayed on the data display device 25, and then the operator is inquired whether a character noise area is extracted properly or not.

Next, from Step S7 to Step S11 of FIG. 3, the eliminating operations for black character noise and white character noise may be conducted sequentially. Operations at each processing are same as the one described, so that explanations thereof will be omitted.

Next, an advantageous effect of the fingerprint image enhancing device 10 will be explained.

The fingerprint image enhancing device 10 eliminates a character noise as an operator is provided an interface (the character noise area determining device 24, the data display device 25, and as the data input device 26) that enables the operator to input the character noise density threshold effectively and manually to determine an exact character noise area, then the density conversion area layer determining device 27 sets a plurality of density conversion area layers outside and inside the noise area, and the density converting device 28 enhances a ridgeline by applying the local image enhancement method (adaptive histogram equalization method or adaptive contrast stretch method), limiting each density conversion area layer. The character noise in this case means an atypical background noise, and includes both of a black character noise and a white character noise.

Consequently, fingerprint ridgelines are enhanced and extracted easily. When it is adopted for a case of a latent fingerprint, a character noise can be eliminated both in the cases with a black character noise and a white character noise, and fingerprint ridgelines with those ridgelines enhanced can be displayed. Thus, it helps the investigator to make a judgment easily. Further, feature extraction can be performed by using an image from which a character noise is eliminated. Thus, feature amount can be extracted more precisely, and fingerprints can be identified more accurately.

The character noise area determining device 24 displays a binary image which is binarized with a binarization threshold designated by an operator and a profile of the input image on the data display device 25. Thus, the operator can select and input an appropriate binarization threshold easily.

The character noise area determining device 24 displays a character noise area on the data display device 25, turning it into black when the binarization threshold for white character noise is inputted. Thus, the operator can easily judge whether the inputted binarization threshold is appropriate or not, as well as the case with a black character noise.

The character noise area determining device 24 may set up a density threshold for black character noise and a density threshold for white character noise independently. However, if both density thresholds are designated at the same time and elimination of a black character noise and a white character noise is performed sequentially, the operation becomes easier.

Next, another exemplary embodiment of the present invention will be explained. As a second exemplary embodiment of the present invention, in the character noise eliminating apparatus described above, the character noise area determining device may display an image and a profile of density values for the image on the data display device.

According to the above, the operator can decide a binarization threshold to be inputted by viewing the image and the density profile, and thereby a proper binarization threshold can be determined more easily.

As a third exemplary embodiment of the present invention, in the character noise eliminating apparatus described above, when the character noise is a black character noise, the character noise area determining device may generate a binary image by converting an area having a density value equal to or more than the binarization threshold of the image into black, and converting an area having density value less than the binarization threshold of the image into white, and when the character noise is a white character noise, the device may generate a binary image by converting an area having a density value less than the binarization threshold of the image into black, and converting an area having a density value equal to or more than the binarization threshold of the image into white.

According to the above, even if the character noise is a white character noise, a character noise area is displayed in black as well as the case when the character noise is a black character noise. Thus, the operator can make a judgment easily.

As a fourth exemplary embodiment of the present invention, in the character noise eliminating apparatus described above, upon receiving an input of a binarization threshold for black character and a binarization threshold for a white character as the binarization threshold, the character noise area determining device may generate a binary image for black character by converting an area having a density value equal to or more than the binarization threshold for black character of the image into black and an area having a density value less than the binarization threshold for black character into white, and generate a binary image for white character by converting an area having a density value less than the binarization threshold for white character of the image into black and an area having a density value equal to or more than the binarization threshold into white. Then, the density converting device and the density conversion area layer determining device may set up a density conversion area layer and may generate a density converted image sequentially with respect to the binary image for black character and the binary image for white character.

According to the above, the operator can designate the binarization thresholds for black character and white character at the same time, and can eliminate the black character noise and the white character noise at once. Thus, the operations become easy.

As a fifth exemplary embodiment of the present invention, in the character noise eliminating method described above, the character noise area determining step may include a process in which an image and a profile of density values for the image may be displayed on the data display device.

As a sixth exemplary embodiment of the present invention, in the character noise eliminating method, the character noise area determining step may include a process in which, when the character noise is a black character noise, a binary image may be generated by converting an area having a density value more than the binarization threshold of the image into black and an area having a density value less than the binarization threshold of the image into white, and when the character noise is a white character noise, a binary image may be generated by converting an area having a density value less than the binarization threshold of the image into black and an area having a density value equal to or more than the binarization threshold of the image into white in the case with a white character noise.

As a seventh exemplary embodiment of the present invention, in the character noise eliminating method, the character noise area determining step may include a process in which, upon receiving an input of a binarization threshold for black character and a binarization threshold for a white character as the binarization threshold, a binary image for a black character noise may be generated by converting an area having a density value equal to or more than the binarization threshold for black character of the image into black and an area having a density value less than the binarization threshold for black character of the image into white, and a binary image for white character may be generated by converting an area having a density value less than the binarization threshold for a white character noise of the image into black and an area having a density value equal to or more than the binarization threshold for white character into white. Then, the binary image for black character noise and the binary image for white character noise may be processed sequentially in the density converting step and the density conversion area layer determining step.

As an eighth exemplary embodiment of the present invention, in the character noise eliminating program described above, the character noise area determining processing may include a process in which an image and a profile of density values for the image may be displayed on the data display device.

As a ninth exemplary embodiment of the present invention, in the character noise eliminating program described above, the character noise area determining processing may include a process in which, when the character noise is a black character noise, a binary image may be generated by turning an area having a density value equal to or more than the binarization threshold of the image into black and an area having a density value less than the binarization threshold into white, and when the character noise is a white character noise, a binary image may be generated by turning an area having a density value less than the binarization threshold of the image into black and an area having a density value equal to or more than the binarization threshold into white.

As a tenth exemplary embodiment of the present invention, the character noise eliminating program described above may make a computer execute the character noise area determining processing in which, upon receiving an input of the binarization thresholds for black character and white character as the binarization threshold, a binary image for black character is generated by converting an area having a density value equal to or more than the binarization threshold for black character of the image into black and an area having a density value less than the binarization threshold for black character into white, and a binary image for white character is generated by converting an area having a density value less than the binarization threshold for white character of the image into black and an area having a density value equal to or more than the binarization threshold for white character into white. Then, the program may make the computer execute the density converting processing and the density conversion area layer determining processing sequentially for the binary images for black character noise and white character noise.

According to aforementioned the character noise eliminating method and the character noise eliminating program can solve the problem regarding the present invention, as well as the character noise eliminating device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A character noise eliminating apparatus comprising:
a character noise area determining device which generates a binary image and determines the character noise area depending on the generated binary image;
a density conversion area determining device which sets a plurality of density conversion areas inside and outside the character noise area,
 wherein the plurality of density conversion areas are only areas adjacent to the determined character noise area;
a density converting device which sets, as a reference area of a target pixel, a neighboring pixel group within the same density conversion area as the density conversion area to which the target pixel belongs, and which generates a density converted image by applying local image enhancement; and
an image synthesizing device which generates a synthetic image, from which background character noise from a fingerprint or a palm print image is eliminated, based on the density converted image.

2. The character noise eliminating apparatus as claimed in claim 1, wherein the character noise area determining device displays the image and a profile of density values for the image on a data display device.

3. The character noise eliminating apparatus as claimed in claim 1, wherein the character noise area determining device generates the binary image by converting an area having a density value equal to or more than a binarization threshold of the image into black and an area having a density value less than the binarization threshold into white, if the character noise is a black character noise, and
 wherein the character noise area determining device generates the binary image by converting an area having a density value less than the binarization threshold of the image into black and an area having a density value equal to or more than the binarization threshold into white, if the character noise is a white character noise.

4. The character noise eliminating apparatus as claimed in claim 1, wherein, upon receiving an input of a binarization threshold for black character noise and a binarization threshold for white character noise, the character noise area determining device generates a binary image for black character by converting an area having a density value equal to or more than the binarization threshold for black character into black and an area having a density value less than the binarization threshold for black character into white, and
 wherein the character noise area determining device generates a binary image for white character by converting an area having density value less than the binarization threshold for white character into black and an area having a density value equal to or more than the binarization threshold for white character into white, and
 wherein the density converting device and the density conversion area determining device set up the density conversion area and generate the density converted image sequentially with respect to the binary image for black character and the binary image for white character.

5. A character noise eliminating means comprising:
a character noise area determining means for generating a binary image, and determining the character noise area depending on the generated binary image;
a density conversion area determining means for setting a plurality of density conversion areas inside and outside the character noise area,
 wherein the plurality of density conversion areas are only areas adjacent to the determined character noise area;
a density converting means for setting, as a reference area of a target pixel, a neighboring pixel group within the same density conversion area as the density conversion area to which the target pixel belongs, and for generating a density converted image by applying local image enhancement; and
an image synthesizing means which generates a synthetic image, from which background character noise from a fingerprint or a palm print image is eliminated, based on the density converted image.

6. A character noise eliminating method comprising:
generating a binary image, and determining the character noise area depending on the generated binary image;
setting a plurality of density conversion areas inside and outside the character noise area,
 wherein the plurality of density conversion areas are only areas adjacent to the determined character noise area;
setting, as a reference area of a target pixel, a neighboring pixel group within the same density conversion area as the density conversion area to which the target pixel belongs, and generating a density converted image by applying local image enhancement; and
generating a synthetic image, from which background character noise from a fingerprint or a palm print image is eliminated, based on the density converted image.

7. The character noise eliminating method as claimed in claim 6, wherein the image and a profile of density values for the image are displayed on a data display device in determining the character noise area.

8. The character noise eliminating method as claimed in claim 6, wherein, in determining the character noise area, the binary image is generated by converting an area having a density value equal to or more than a binarization threshold of the image into black and an area having a density value less than the binarization threshold into white if the character noise is a black character noise, and
 wherein the binary image is generated by converting an area having a density value less than the binarization threshold of the image into black and an area having a density value equal to or more than the binarization threshold into white, if the character noise is a white character noise.

9. The character noise eliminating method as claimed in claim 6, wherein, in determining the character noise area, depending on an input of a binarization threshold for black character and a binarization threshold for white character, the binary image for black character is generated by converting an area having a density value equal to or more than the binarization threshold for black character of the image into black and an area having a density value less than the binarization threshold for black character into white, and a binary image for white character is generated by converting an area having a density value less than the binarization threshold for white character of the image into black and an area having a density value equal to or more than the binarization threshold for white character into white, and
 wherein, in setting the plurality of density conversion areas inside and outside the character noise area, and setting the neighboring pixel group within the same density conversion area as the density conversion area to which the target pixel belongs, and in the generating a density converted image by applying local image enhancement, the binary image for black character and the binary image for white character are sequentially processed.

10. A non-transitory computer readable storage medium storing a character noise eliminating program making a computer execute:
   a character noise area determining processing which generates a binary image, and determines the character noise area depending on the generated binary image;
   a density conversion area determining processing which sets a plurality of density conversion areas inside and outside the character noise area,
      wherein the plurality of density conversion areas are only areas adjacent to the determined character noise area;
   a density converting processing which sets, as a reference area of a target pixel, a neighboring pixel group within the same density conversion area as the density conversion area to which the target pixel belongs, and generates a density converted image by applying local image enhancement; and
   a synthetic image generating processing which generates a synthetic image, from which background character noise from a fingerprint or a palm print image is eliminated, based on the density converted image.

11. The non-transitory computer readable storage medium as claimed in claim 10, wherein the image and a profile of density values for the image are displayed on a data display device in the character noise area determining processing.

12. The non-transitory computer readable storage medium as claimed in claim 10, wherein, in the character noise area determining processing, the binary image is generated by converting an area having a density value equal to or more than a binarization threshold of the image into black and an area having a density value less than the binarization threshold into white if the character noise is a black character noise, and
   wherein the binary image is generated by the converting an area having a density value less than the binarization threshold into black and an area having a density value equal to or more than the binarization threshold into white, if the character noise is a white character noise.

13. The non-transitory computer readable storage medium as claimed in claim 10, wherein the character noise eliminating program makes the computer execute:
   the character noise area determining processing, upon receiving an input of a binarization threshold for black character and a binarization threshold for white character, in which a binary image for black character is generated by converting an area having a density value equal to or more than the binarization threshold for black character of the image into black and an area having a density value less than the binarization threshold for black character into white, and in which a binary image for white character is generated by converting an area having a density value less than the binarization threshold for white character of the image into black and an area having a density value equal to or more than the binarization threshold for white character into white, and
   the density converting processing and the density conversion area determining processing sequentially for the binary image for black character and the binary image for white character.

14. The character noise eliminating apparatus as claimed in claim 1, wherein the plurality of density conversion areas are only areas influenced by the background character noise.

15. The character noise eliminating apparatus as claimed in claim 1, wherein the plurality of density conversion areas are only areas where blurring of characters is expected to occur.

* * * * *